United States Patent [19]

Hammes

[11] 4,419,690
[45] Dec. 6, 1983

[54] METHOD AND APPARATUS FOR PRODUCING A HALF-TONE REPRODUCTION

[75] Inventor: Philippe Hammes, Massy, France

[73] Assignee: Crosfield Electronics Limited, London, England

[21] Appl. No.: 296,670

[22] Filed: Aug. 27, 1981

[30] Foreign Application Priority Data

Sep. 1, 1980 [GB] United Kingdom ................. 8028176

[51] Int. Cl.³ ............................................. H04N 1/46
[52] U.S. Cl. ................................................. 358/75
[58] Field of Search ........................................ 358/75

[56] References Cited

U.S. PATENT DOCUMENTS

| 4,084,183 | 4/1978 | Keller | 358/75 |
| 4,293,873 | 10/1981 | Barendregt | 358/75 |
| 4,302,770 | 11/1981 | Hubbard | 358/75 |
| 4,319,268 | 3/1982 | Yamada | 358/75 |

*Primary Examiner*—Michael A. Masinick
*Attorney, Agent, or Firm*—Sughrue, Mion, Zinn, Macpeak and Seas

[57] ABSTRACT

A half-tone reproduction of an original image is made by exposing an output surface OS such as a film wrapped around a rotating drum to a modulated, multiple-head laser scanning beam. The modulation of each scanning beam SB, SB1 is determined by a control signal derived by generating digital position signals representing the position of the scanning beam within a half-tone dot area DA of an imaginary "electronic" screen grid SG inclined at a screen angle $\beta$ to a horizontal line on the output surface, each successive position x in the screen grid being computed by the repeated addition of small increments to the previous position signals, and, at each successive position, the position signals being compared with a predetermined value to detect the crossing of the border of the dot area, comparing each of the position signals with a picture signal representing the picture density at the corresponding point of the original image to be reproduced, and combining the results of the comparisons to generate the control signal. The picture signal determines the size of the dot required, and hence the position in the screen grid of the dot border DB. Its comparison with the position signals thus indicates the required output modulation. For simple "hard" dots this is an on/off modulation, with the control signal being on (1) or off (0) at successive points of the scan. The computer may, however, derive a multiple-level output modulation control signal to give "soft" dots of any shape.

24 Claims, 30 Drawing Figures

METHOD AND APPARATUS FOR PRODUCING A HALF-TONE REPRODUCTION

The invention relates to a method and apparatus for producing a half-tone reproduction of an original image by exposing an output surface to a beam of varying intensity.

This may be used in the production of colour separations, when a coloured original is scanned by a traversing optoelectronic scanner as the original is rotated on a cylindrical roller, to obtain colour separation signals representing intensities of, for example, yellow, magenta and cyan. The intensities are then corrected in a colour computer to derive picture signals for each colour. The signals are used to determine the size of the dots necessary, for that particular region being scanned, to create the half-tone image produced on the output surface. High tonal densities in the original require for their synthesis large dots in the half-tone dot pattern on the output surface. The half-tone dots may be of any shape, and one dot pattern may have dots of more than one shape or orientation.

A half-tone dot pattern generally consists of repeated rows of dots, the rows making an angle known as the screen angle with the direction of motion of the output surface relative to the recording heads. The screen angle in the simplest case is 90° when the rows of dots are aligned with the axis of the cylinder around which is fixed the output surface. Preferably, though, different colour separations are given different screen angles, to avoid, or at least minimize, the unsightly Moiré-type fringe patterns in the final image when all the coloured dot patterns are superimposed.

A method of production of half-tone facsimile separations with optional screen angles is disclosed in U.K. Patent Application No. 2026283. Half-tone "hard" dots are created by exposing an output surface to parallel beams which are either on or off, and are controlled by an electronic circuit. The output surface is scanned in accordance with the scanning of an original image to be reproduced, and the electronic circuit responds to the brightness of the original image at the point being scanned, and to the position of the scan of the output surface relative to an "electronic screen grid" inclined at a "screen angle" to the output surface. The electronic screen grid is not a real screen superimposed on the output surface, as has been used in the past for obtaining half-tone modulation of an exposing beam, but is an imaginary device for computing the modulation of an electronic signal in accordance with a half-tone dot grid at a desired screen angle ($\beta$), line spacing and magnification.

The output surface is a rectangular separation wrapped around a drum which is scanned helically, and it is difficult to obtain a correct value for the position of the scanning beam relative to the rectangular electronic screen grid each time a new vertical scan of the output surface is commenced. This can give rise to unsatisfactory half-tone dot patterns. Furthermore, in this known method, the progress of the scan across the electronic screen is effected by the repeated addition of small, constant increments to coordinates representing the scan position. In this method, the resolution of the dot pattern is limited by the number of bits of information allocated to defining the position of the scan within one elementary unit of the screen grid, corresponding to one dot area. The increments to the position coordinates are constant throughout the scan. The method is also made less flexible because the number of bits defining one side of a unit of the screen grid also has to be a power of two, for example thirty-two.

As mentioned above, the method of this prior specification is suitable only for "hard" dots. British Patent No. 1,492,740 discloses a multiple beam half-tone system which is capable of producing a certain kind of "soft dot", but still has many limitations, and in particular cannot produce a dot pattern with uniform etchability. Moreover, recently-produced films require overexposure at the dot centres which exceed that obtainable with this known system. The present invention is aimed at providing a method of half-tone reproduction which overcomes all the limitations above, and can also be used to produce "soft dots" with uniform etchability and adequate exposure levels, with the or each scanning beam intensity varying between more than two levels for soft dots.

A method according to the invention of making a half-tone reproduction of an original image by exposing an output surface to a scanning beam which assumes conditions in accordance with the value of a control signal, comprises, for the generation of the control signal, the steps of:

(a) generating position signals representing the position of the scanning beam within a half-tone dot area or other elemental area of a screen grid, each successive position in the screen grid of the scanning beam being determined by the repeated addition of small increments to the previous position, and, at each successive position, the position signals being compared with a predetermined value to detect the crossing of the border of the dot area or other elemental area;

(b) comparing each of the said position signals with a picture signal representing the picture density at the corresponding point of the original image to be reproduced; and (c) combining the results of the said comparisons to generate the control signal which causes the scanning beam to write on the output surface in accordance with the result of the said combination of results.

For a "hard dot" reproduction, the scanning beam assumes "on" and "off" conditions in accordance with two possible values of the control signal.

The method may include, in step (a), the step of deriving from the said position signals a single index signal for the scanning beam;

and in step (b) the index signal is then compared with the picture signal.

For a "soft dot" reproduction, by exposing the output surface to the scanning beam which assumes a level of intensity in accordance with the value of the control signal, in step (b) the said position signals or the said index signal are combined with the picture signal; and in step (c) the results of the said combinations are processed to generate the control signal which causes the scanning beam to record at a level of intensity in accordance with the said processing of the results.

In the preferred embodiments of the invention, step (a) includes the generation, when crossing the said border, of a new value for each of the position signals within the new references of the new dot area or other elemental area. The said small increments preferably remain unaltered as the beam scans across an elemental area, but are given special border values whenever the beam crosses into a new elemental area. Usually, the position signals within a half-tone dot area or other elemental area are compared with a signal representing the width of a half-tone dot area after the said addition of the small increments, in order to determine whether the scanning beam has approached the border of the half-tone dot area or elemental area of the screen grid, and, if so, the signals are adjusted to represent the arrival of the scanning beam at the opposite side of the same half-tone dot area or the same elemental area, causing the scanning beam effectively to scan only one such area.

The scanning beam preferably scans through a succession of equally-spaced, parallel, substantially vertical lines over the output surface, and the step (a) preferably includes the step of recognizing that a vertical scan has finished, and then initialising the position signals for a new vertical scan. In the preferred embodiments, a plurality of beams, for example six beams, scan the output surface in parallel, each beam being controlled independently according to the method described above, with the exception that all the beams are initialized in accordance with their relative positions on the output surface.

In any of the above, the said picture signal is generally obtained by analysing the original by means of a "read" scanning beam, which scans simultaneously with, and along a line parallel to, the said scanning beam. The picture signal may, alternatively, be obtained from a memory storing the result of a previous analysis of the original image. Other processes may take place between the "read" scanning of the original and the "write" scanning of the output surface, for example the assembly of images into a page, colour correction, gradation editorial adjustment, detail enhancement, etc.

According to another aspect of the invention, position signals are generated for each scanning beam and for each of two or more different colour separations which require different screen angles, the position signals corresponding to the different values of the screen angles being computed either simultaneously, or sequentially according to the rotation of each successive colour separation output surface past a recording head.

Preferably, at least two output surfaces, to form two colour separations after exposure, are wrapped around a drum so that each passes the same exposing head in each revolution of the drum, and the extraction from a store of picture signals for each successive colour separation is controlled synchronously with the changing of the screen angle to be used in the position signal computation.

In order that the invention may be better understood, several embodiments of the invention will now be described with reference to the accompanying drawings, in which.

Figure 1:
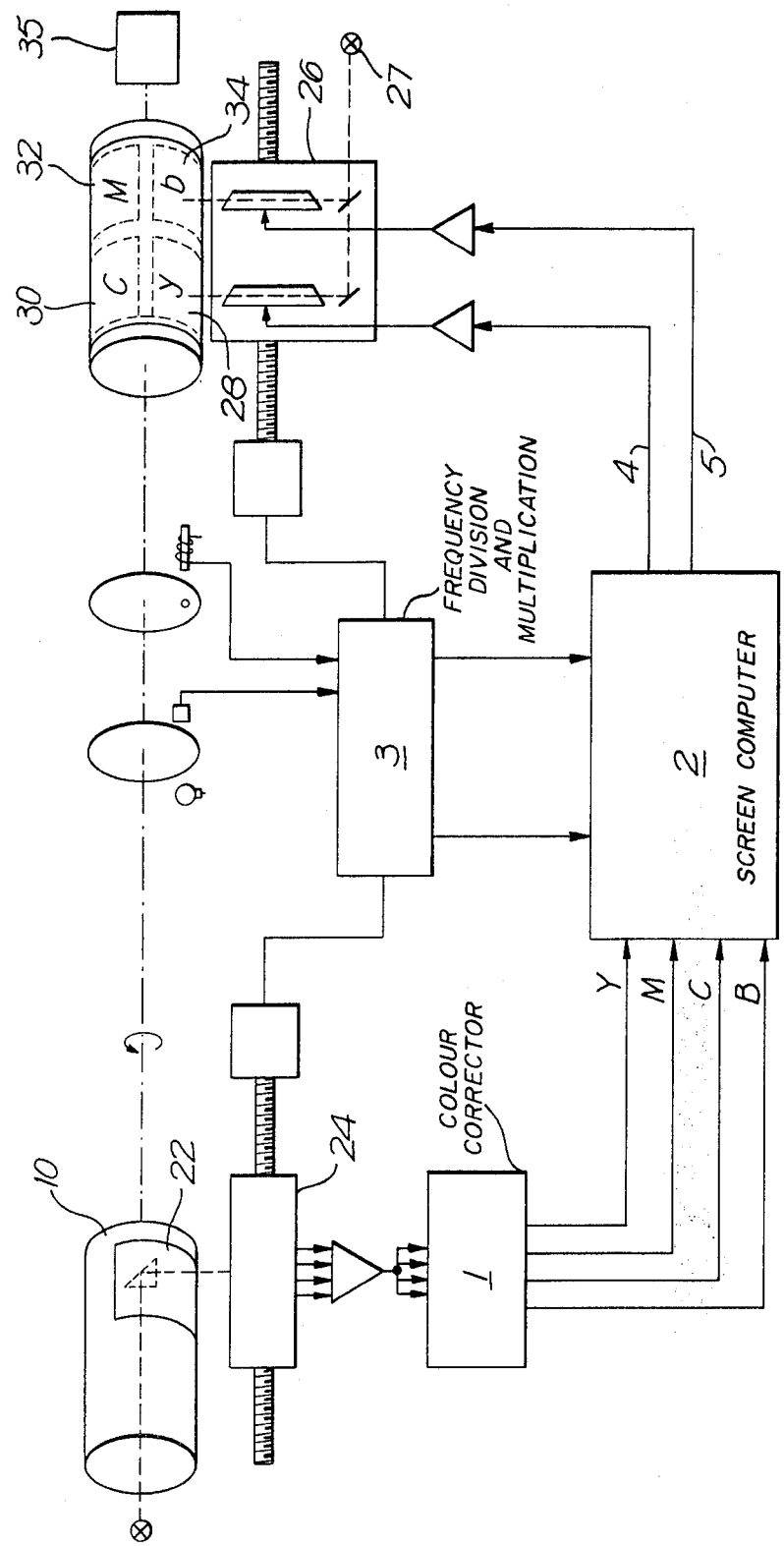
FIG. 1 is a schematic diagram of a conventional half-tone reproduction system.
Figure 2:
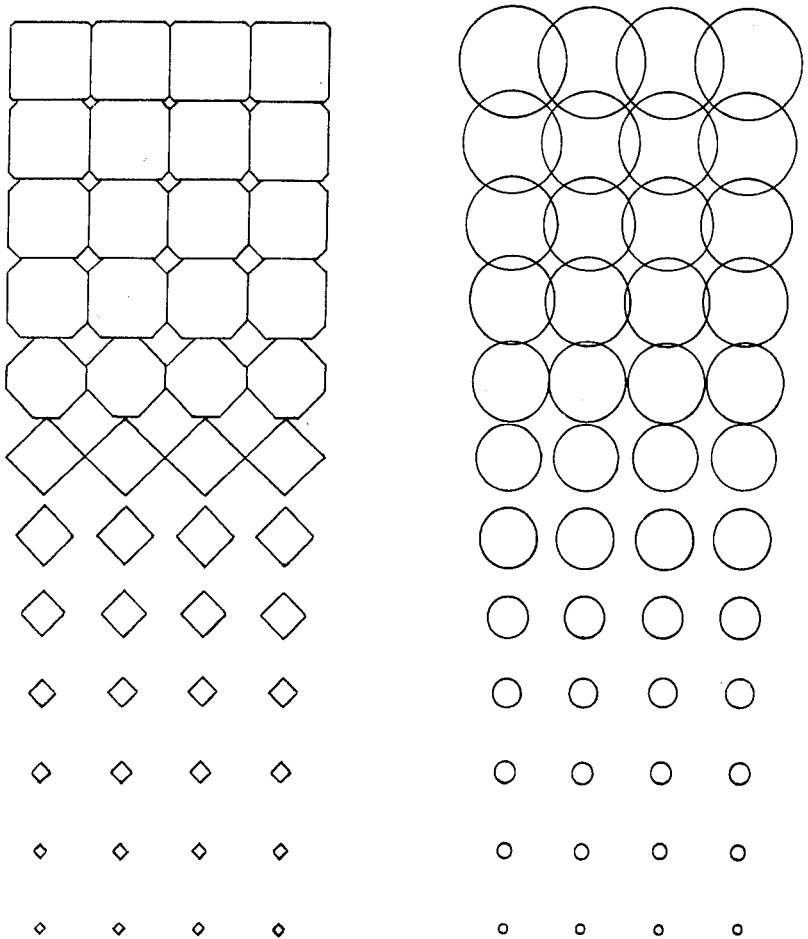
FIG. 2 shows how increasing the size of the dots in a half-tone pattern gives a denser image.

Apparatus for producing half-tone colour separations from an original image generally comprises at least two rotating coaxial drums as shown in FIG. 1. An original 22 is wrapped round one drum 10 and output surfaces 28, 30, 32, 34 which are to be exposed are wrapped round another drum or drums, the drums being in this case driven by a common motor 35. The output surfaces for the different colour separations may occupy successive sections (e.g. 28, 30) of the perimeter of one output drum, they may be relatively displaced (as at 30, 32) along the axis of the drum, or they may be arranged on different drums. The original image is scanned by an opto-electronic scanning head 24 by rotating its drum 10 past the head 24 and imparting in addition a slow longitudinal movement to the head so that the scanning path on the surface of the cylindrical drum is helical. Signals from the scanning head then pass through a colour corrector (signal processing unit) 1, if necessary, in which a fourth signal, black, is also usually generated, and emerge as the "picture signals" Y, M, C, B for that particular colour. The output surfaces, which are sensitive to light from an exposing head 26 adjacent to the other drums, are scanned by the exposing head in a similar manner, and are exposed progressively to a half-tone pattern made from dots of a size depending on the colour tonal density of the original. Examples of half-tone patterns are shown in FIG. 2, in which the tonal density increases from left to right. The signals 4, 5 controlling the modulation of light from a source 27 are obtained from a screen computer 2 fed with the colour component signals Y, M, C and B. A frequency division and multiplication unit 3, receiving pulses related to the rotation of the drums, controls the slow longitudinal movement of the heads 24 and 26 and the operation of the screen computer 2.

Various screen computers embodying the invention for generating a control signal or signals for each colour separation with which to control the output of the exposing heads, i.e. the scanning beam, will be described with reference to FIGS. 5, 6 and 8 to 15. Each screen computer is responsive to the picture signal and to timing signals from the rotating drums, and is programmed with any desired screen angle and screen line spacing.

Figure 3:
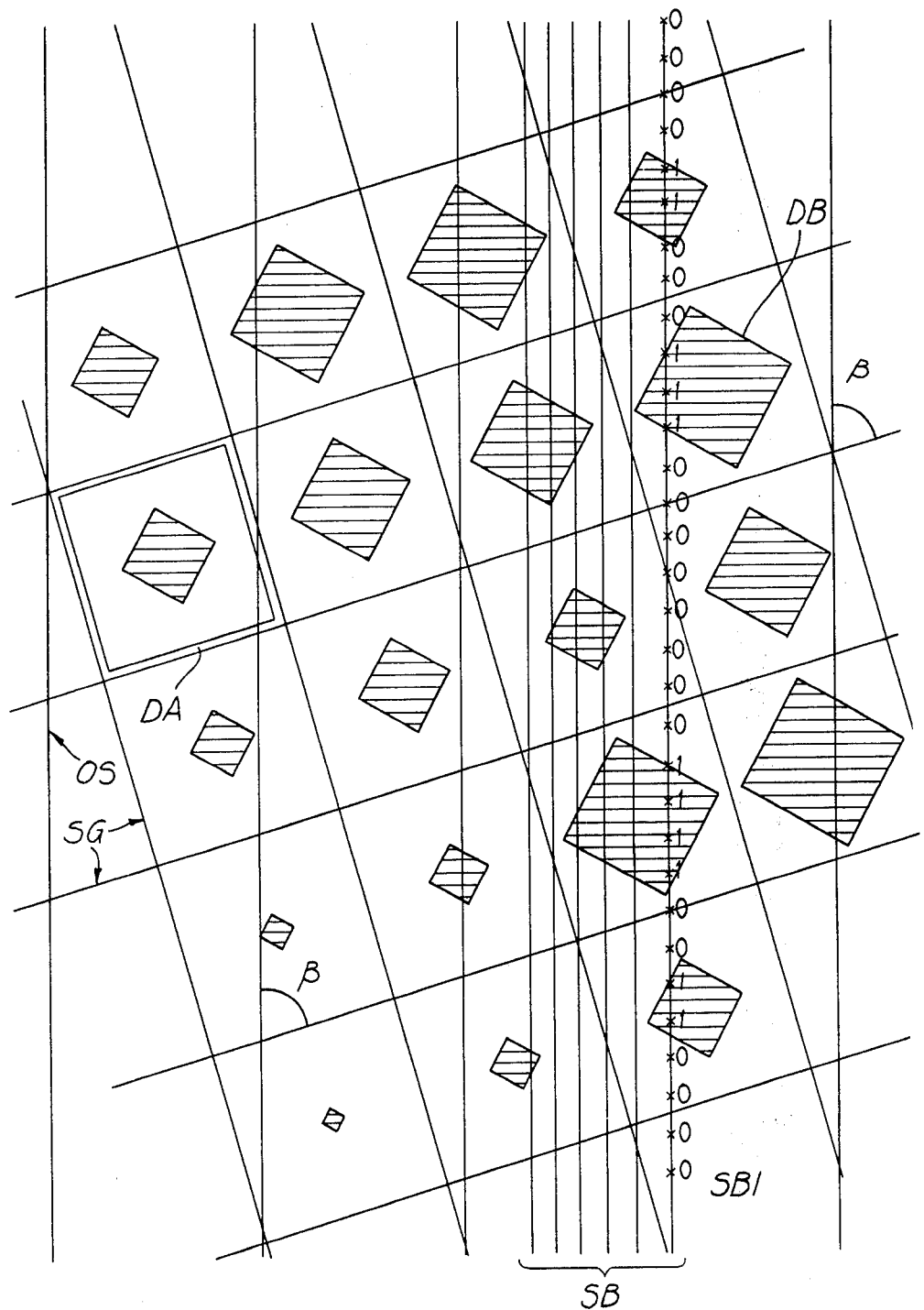
FIG. 3 is a sketch showing the idealized output surface on which is superimposed a screen grid at an angle β according to the invention.

Referring first to FIG. 3, vertical lines in the output surface (OS) are perpendicular to the drum axis, and horizontal lines are parallel to the drum axis, so that the helical path of the exposing head, i.e. the scanning beam, is very closely parallel to the vertical lines. For a screen angle $\beta$, the dots are created in a screen grid (SG) at the angle $\beta$ to the output surface (OS). Examples of the paths of the scanning beam are shown as SB. At each point of the SB1 line marked with a cross, for example, the picture signal is determined, which dictates the size of the dot required to represent the particular level of tonal density at the corresponding point in the original image. This dot size may vary over the region as indeed shown in FIG. 3 hence the different sizes of the dot. It may even vary within one dot area (DA), which would lead to a distorted dot. The dots shown in FIG. 3 by way of example are square dots "tilted" at 45° to the grid, the shaded areas being bounded by the dot borders (DB). The pattern of dots shown may be created on the output surface by controlling the scanning beam by an "on/off" signal in accordance with whether the scanning beam lies over a dot ("on") or a space ("off") in the overlying screen grid. At each point marked x, the value of this signal is indicated by "1" or "0". The signal is obtained subsequently for all similar points along the helical path SB of the scan which overlie the output surface.

It is emphasized that the screen grid is an artificial device to aid the description of the working of the computer. No real dot screen exists, as in some earlier patents.

Figure 4:
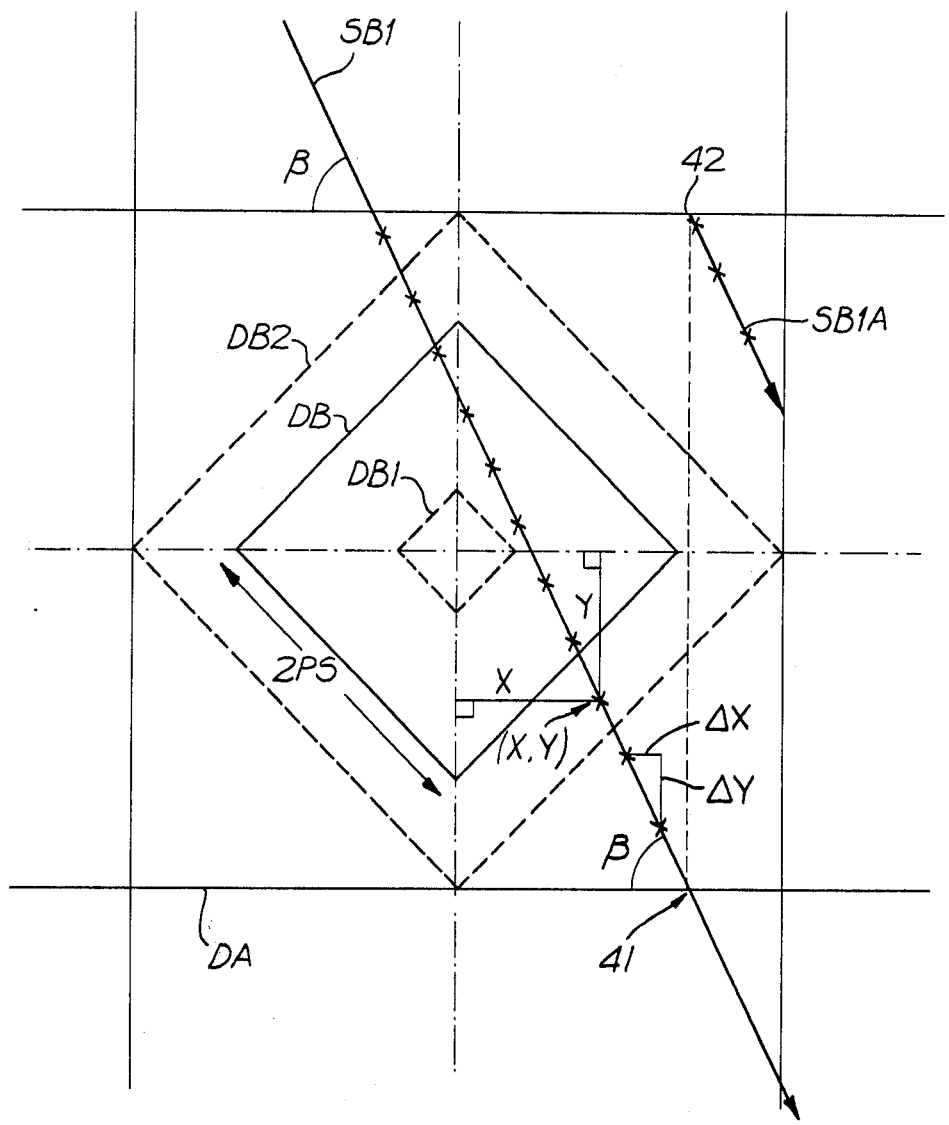
FIG. 4 shows one dot area of the screen grid in FIG. 3.

Referring now to FIG. 4, one dot area is shown in dotted lines. The diagram has been rotated through the screen angle $\beta$ relative to the diagram of FIG. 3. A dot bounded by the border DB2 is 50% the maximum dot size. A small dot might have a border DB1, but from now on an intermediate dot size will be assumed, the dot having a border DB. It is useful to equate the value of the picture signal (PS) with half the dot width: in this way the picture signal is seen to determine the dot size directly. The position x of the "write" scanning beam relative to a dot area (DA) and a dot border (DB) is described by two position signals. These may be relative to coordinate axes (X,Y) aligned with the dot area boundaries as shown, or axes (H1, H2) at 45° to the dot area boundaries for example. Each time a timing signal indicates that the scan has progressed to the next point, the next point x of the scanning beam relative to the screen grid is computed by adding increments $\Delta X$ and $\Delta Y$ to the previous position signals X and Y. Of course $\Delta X$ and $\Delta Y$ are determined by the screen angle $\beta$ and by the desired line spacing. The degree of magnification of the final image can be controlled by the size of the increment. $\Delta X$ and $\Delta Y$ are added many times during the traversal of one dot area. The values of the increments determine the screen angle, and may be changed at the beginning of each new vertical scanning line, i.e. at the edge of the separation.

It is also possible to adjust in a regular manner the values of the increments at the crossing of each dot border, so as to increase greatly the number of possible screen angles and rulings. If $\Delta X$ and $\Delta Y$ for example, were constant, then the number of possible screen angles and rulings would be limited by the accuracy to which $\Delta X$ and $\Delta Y$ are defined, i.e. by the number of bits describing $\Delta X$ and $\Delta Y$. The accuracy to which $\beta$ would be defined would be the ratio:

$$\frac{\text{(maximum value of } \Delta X \text{(or } \Delta Y))}{\text{(minimum change in } \Delta X \text{(or } \Delta Y))}$$

However, by adjusting $\Delta X$ and $\Delta Y$ periodically as the dot borders are crossed, and thus alternating the screen angle between two (or more) very close values, the average overall screen angle can be made to assume intermediate values. The precision in the determination of $\beta$ is then:

$$\frac{\text{(sum of all the } \Delta X \text{(or } \Delta Y) \text{ over the whole dot area)}}{\text{(minimum change in } \Delta X \text{(or } \Delta Y))}$$

and the same precision is available in the determination of the screen ruling. This improvement may be by a factor of 60, for example, if the position is corrected at every dot area, or of 120 if it is corrected at alternate dot areas.

Another feature of the system associated with dot border detection is that Moiré fringes can be avided by choosing the memory to be of such a size that the width of the dot areas is suited exactly to the number of scanning beams. The width of a dot area is not necessarily a power of 2, as in UK Patent Application No. 2026283, but is usually chosen to be a multiple of the number of beams and depends on the gaps between the beams.

The screen computer of FIG. 5 functions as follows. A position computer 40 generates position signals H1 and H2 representing distances along orthogonal axes at 45° to X, Y, as mentioned above, at each point x. These signals are then each compared with the picture signal PS in a comparator unit, in order to determine whether the control signal 50 should be "on" or "off". If the point x lies within the dot border DB, then both H1 and H2 should be less than PS, and an "on" signal is generated. Otherwise an "off" signal is generated. Suitable position computers are described hereinafter with reference to FIGS. 18 to 22 of the accompanying drawings.

For this system to work, H1 and H2 cannot represent points outside a dot area, the dot area being the smallest repeatable unit of the dot pattern. Therefore it is necessary for the position computer to detect the crossing of the border by the scanning beam, and to adjust H1 and H2 so that they then represent the arrival of the beam at the opposite edge of the dot area. This is shown also in FIG. 4. The beam SB1, on reaching the border at the exit point 41, is treated as though it is arriving at the entry point on the opposite side 42, and then scans in a parallel line SB1A. If the maximum value of H1 or H2 is Hm, then new values for H1 and H2 at the entry point 42 will be: $H1' = H1 + Hm$ and $H2' = H2 + Hm$.

Figure 6:
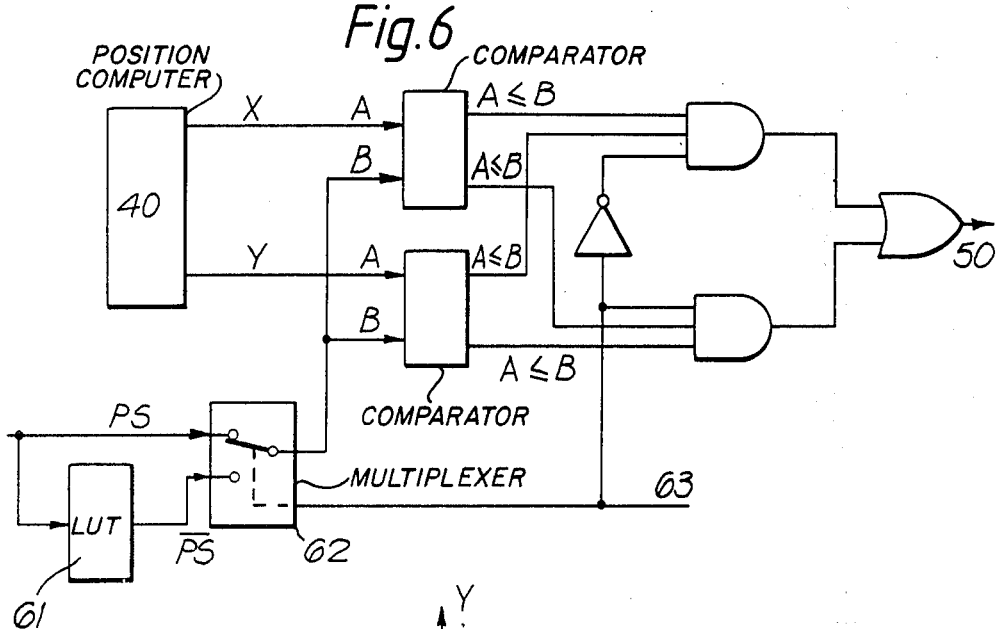
FIG. 6 shows a position computer similar to that shown in FIG. 5 which generates a square dot pattern with the sides of the squares aligned with the screen grid.
Figure 7:
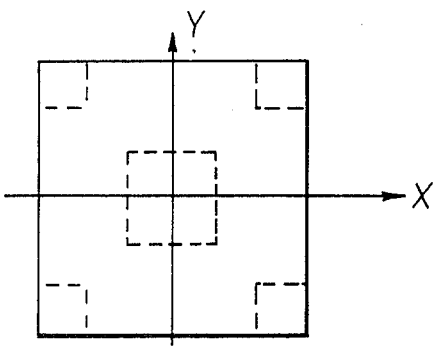
FIG. 7 shows one dot area of the screen grid used in the screen computer of FIG. 6.

FIG. 6 shows an alternative system for generating square dots aligned with the screen grid. To simplify logic, a repeated dot area contains one dot and quarters of four adjacent dots, as shown in FIG. 7. Coordinates (X,Y) are taken in line with the dot walls as in FIG. 4. The position computer functions exactly as above, except that it generates the (X,Y) and not the 45° (H1, H2) position signals. Again, the position computer may be of a type described with reference to FIGS. 18 to 22 of this specification. In addition to the picture signal PS, the comparator requires the difference between PS and half the width of the dot area which is given as a complementary picture signal $\overline{PS}$. A control signal 50 is generated which is "on" whenever the central dot or the corner quarter-dots are scanned, i.e. when X and Y are both less than PS, or both greater than $\overline{PS}$. As shown in FIG. 6, $\overline{PS}$ is obtained from a look-up table (LUT) 61, i.e. read-only memory. One suitable such device, for example, would be a PROM type TBP28L 22 made by Texas Instruments. PS and $\overline{PS}$ are then multiplexed in multiplexer 62 and fed to the computer in accordance with the logic state of a signal 63.

Figure 5:
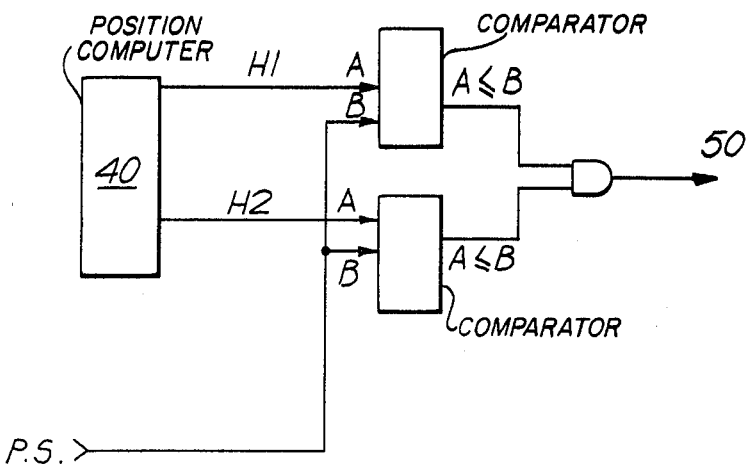
FIG. 5 shows one embodiment of a screen computer according to the invention, which generates a tilted square dot pattern with an "on/off" recording beam.
Figure 8:
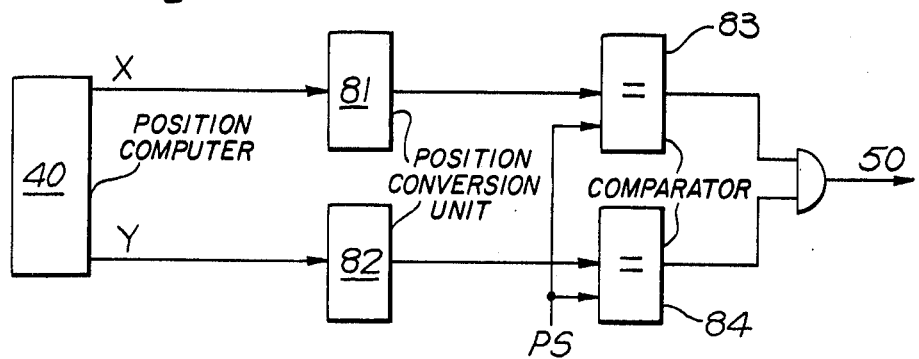
FIG. 8 shows a screen computer for generating a rhombic or lozenge-shaped dot pattern.

The screen computer of FIG. 5, for example, can be modified to produce dots that are elongated in one or more directions, e.g. to produce diamond-shaped dots instead of square ones. FIG. 8 shows such a modified computer, where each of the position signals (X or Y in this example) is adjusted in a position conversion unit 81 or 82 before it enters a comparator unit 83 or 84. The unit is preferably an LUT, but may alternatively be logic. Again, the position computer may be generally of one of the types described with reference to FIGS. 18 to 22. The LUT may again be of the type TBP28L 22 made by Texas Instruments.

Figure 9:
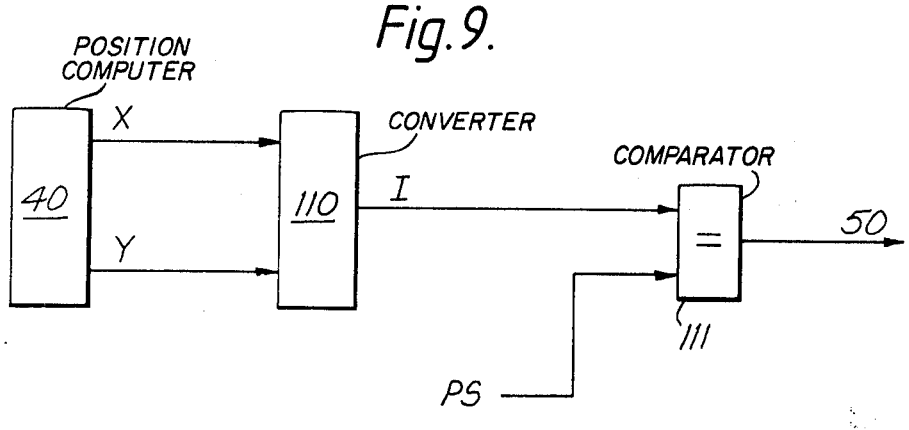
FIG. 9 shows a screen computer for generating dots of any shape by incorporating a special look-up table.

FIG. 9 extends the concept of the screen computer of FIG. 8, to generate not just square or elongate dots, but dots of any shape. This is achieved by a single conversion unit 110. The signal output I from the conversion unit or index signal generation unit 110 is referred to as an index signal. The index signal is compared with the picture signal PS in a comparator 111. The index signal generation unit 110 may consist of logic circuitry, but is preferably an LUT. The LUT may, for example, comprise two RAM units of the type HM6116 made by Hitachi, which would give an LUT capacity of $2^{12} \times 8$. The contents of the table depend upon the dot shape. It is the content of the LUT which determines the shape of the dot, and the magnitude of the PS which determines its size.

The position signals preferably represent lengths measured from the centre of the half-tone dot area along orthogonal axes, but the invention is not limited to this coordinate system.

If the shape of the dot to be generated has a degree of symmetry, it will be appreciated that much of the data in the position conversion LUT is redundant. For example, if each quarter of the dot is the same shape, then an LUT of one quarter of the size only will be needed, together with some means for identifying which orientation to give each quarter of the dot. The screen computer of FIG. 9 may be used to generate dots with symmetry in two orthogonal directions, i.e. with four similar quarters. In addition to the ¼-size generation unit LUT 110 there would be another conversion unit, which may comprise an LUT or logic. This unit effectively changes the position coordinates according to the quadrant of the dot area that they represent, so that the changed position signals will index the LUT 110 according to the correct orientation of the quarter-dot pattern. The two units may be combined.

Symmetrical dots join together at four points simultaneously, on gradually increasing the tonal density. This joining of each dot with its four neighbouring dots is very significant, as it causes a sudden large increase in the apparent density of the half-tone image. It is preferable to choose a dot shape so that the vertices of each dot join neighbouring dots at different tonal densities, so as to make the apparent changes in density smoother. The special dots which join at four vertices at different densities are referred to as four-breakpoint dots. It is convenient to have non-symmetrical dots and to have alternate dots in the rows rotated through 180°; if A represents the dot one way up, and B represents the same dot rotated through 180°, then the dot sequence would be ABAB . . . in both rows and columns. The smallest repeatable square unit is then an element containing four dot areas. However, it is only necessary to store data for one dot (A or B) in an index signal generation unit.

Figure 10:
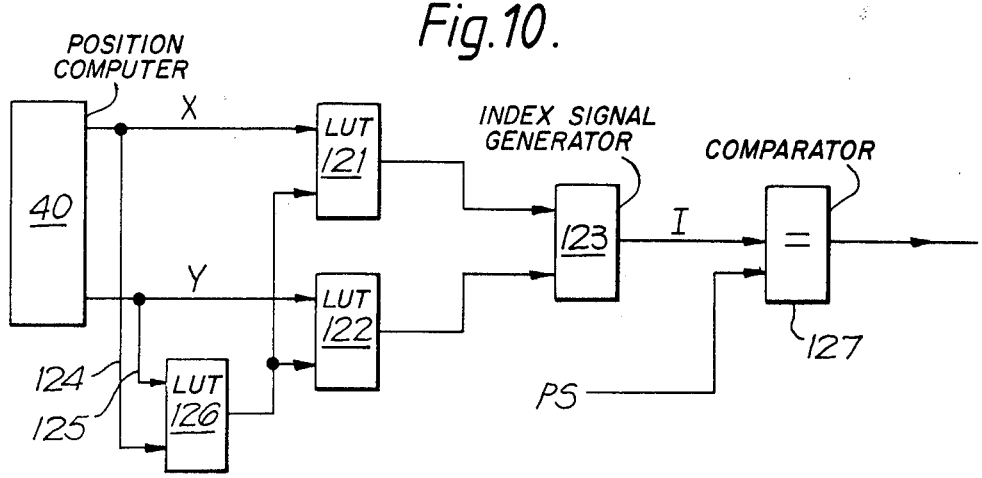
FIGS. 10 and 11 show screen computers for generating an index signal.

FIG. 10 shows one example of a screen computer for generating four break-point chain dots. It differs from FIG. 9 in the provision of intermediate LUT's (or logic) 121, 122 which process the position signals, X, Y respectively, before the position signals are combined in an index signal generation unit 123 to derive an index signal I. Again, LUT's of the type TBP28L 22 made by Texas Instruments would be suitable. The index signal I is compared with the picture signal PS in a comparator 127, the result of the comparison determining the control signal 50. The most significant bits (MSB) 124, 125 of the position signals (X, Y) or (H1, H2) indicate which dot area is being scanned. i.e. whether it should contain an A or B type dot. This condition is detected by an MSB area detect LUT 126 (or by equivalent logic), and signal conversion LUT's 121, 122 (or logic) correct the position signals according to this condition so that they will correctly index the signal generation LUT 123.

Figure 11:
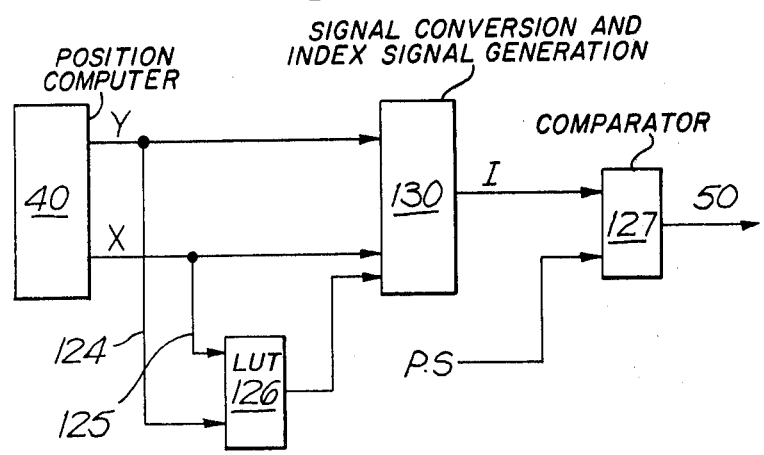

FIG. 11 shows an an alternative computer to that of FIG. 10 wherein the signal conversion LUT's 121, 122 and signal generation unit 123 are combined into a single unit 130.

The screen computing system according to the invention lends itself readily to multiple beam control; with multiple beams however, there is the difficulty of taking into account the fact that adjacent beams will sometimes be in adjacent dot areas. One must compute for each beam separately when crossing a border and suitably modify its position (see below in the description of the position CPU). While the "reading" beam scanning the original generally consists of just one head for each colour, there may be three or more recording heads for any colour scanning the output surface in parallel, closely-spaced lines. An example of five parallel "on/off" beams is given in British Pat. No. 1,386,651. It is not necessary to provide one position computer for each "write" scanning beam; however, it is convenient to do so, and to initialise all the beams by means of a slow microprocessor unit (MPU) at the beginning of each vertical scan. The microprocessor may be a type 6809.

Figure 22:
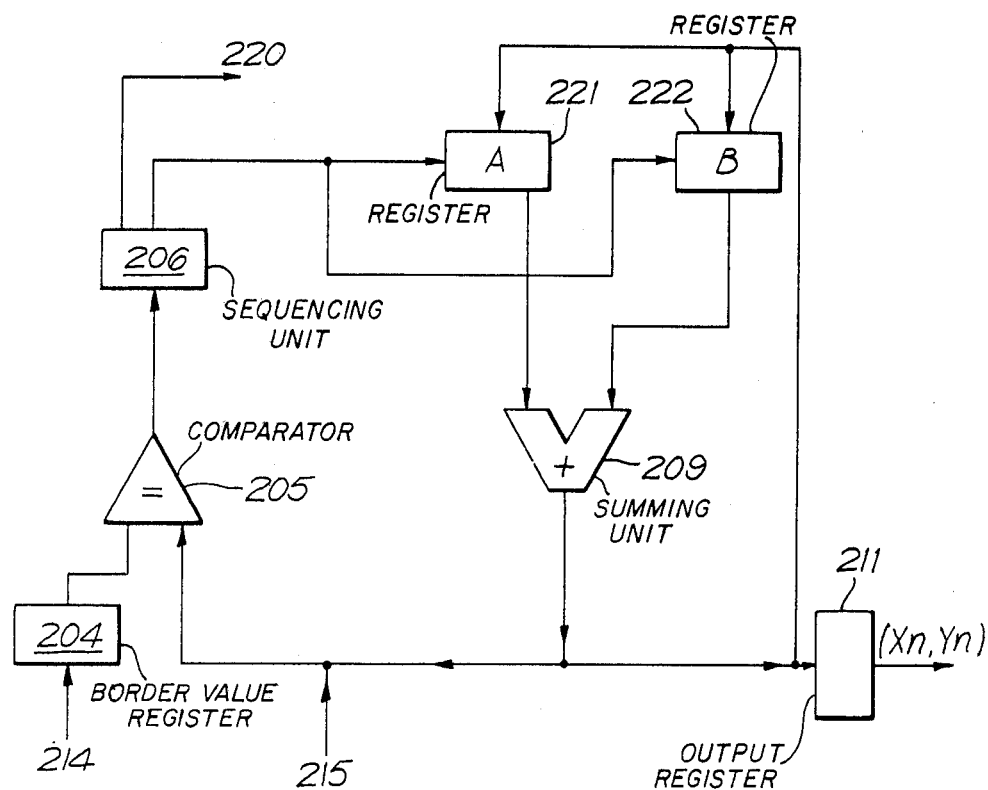
FIG. 22 shows another example of a position computer.
Figure 23:
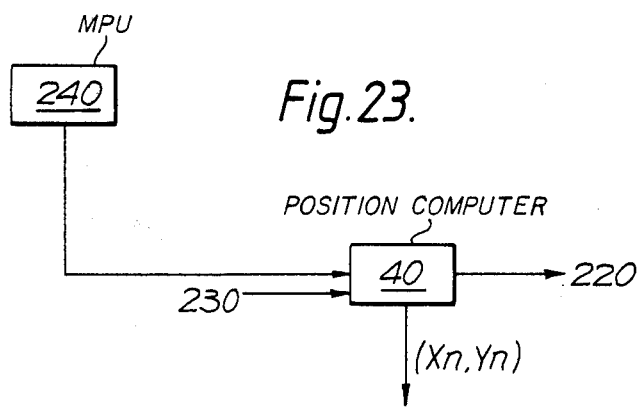
FIG. 23 shows the position computer and the slower "transverse" MPU which initialises the position computer.

As shown in FIG. 23, the position signals at a time n $(X_n, Y_n)$ are produced by a position CPU 40, which is initialized by a slow MPU 240. Suitable position computers are shown in FIGS. 18 to 22. At the beginning of each scan, for example at the top of one separation, the position CPU is initialized with positions $(X_o, Y_o)$. The slow MPU generates $(X_o, Y_o)$ using the same algorithm as the fast CPU but with different values for the increments (ΔX, ΔY). In particular, provision is made by the MPU to detect the border of a dot area while scanning horizontally and to take necessary action. These positions move steadily across the surface as the helical scan progresses. The initializing MPU is known as the "transverse" CPU while the position computer is the "line" or fast CPU. This initialization is indicated as the signal 215 input on FIGS. 20 to 22, which show examples of the fast position CPU.

Figure 18:
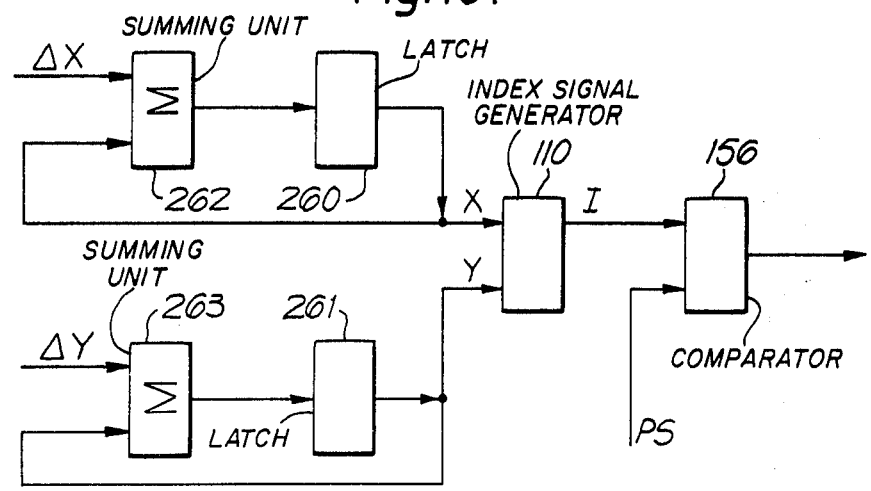
FIG. 18 is a schematic diagram of one example of a position computer.

A first example of the position computer or CPU is shown in FIG. 18. The position signal X is continually recycled through a summing unit 262 and a latch 260, one cycle for each new position of the scanning point x in the screen grid. Once in each cycle, the position increment ΔX is added in summing unit 262 to the position signal X. X and ΔX, Y and ΔY, are 16 bit signals. The corresponding position signal Y is recirculated in summing unit 263 and latch 261 in a similar manner. An index signal generation unit 110 provides an index signal I from position signals X and Y. The index signal I is then compared with the picture signal PS in a comparator 156 to produce an output signal which is "on" if the picture signal exceeds the value of the index signal, for example. It will be appreciated that the system of FIG. 18 is an example of the simplified system shown in FIG. 9. In FIG. 18, the index signal is represented by 8 bits, and the picture signal is also represented by 8 bits.

Figure 19A:
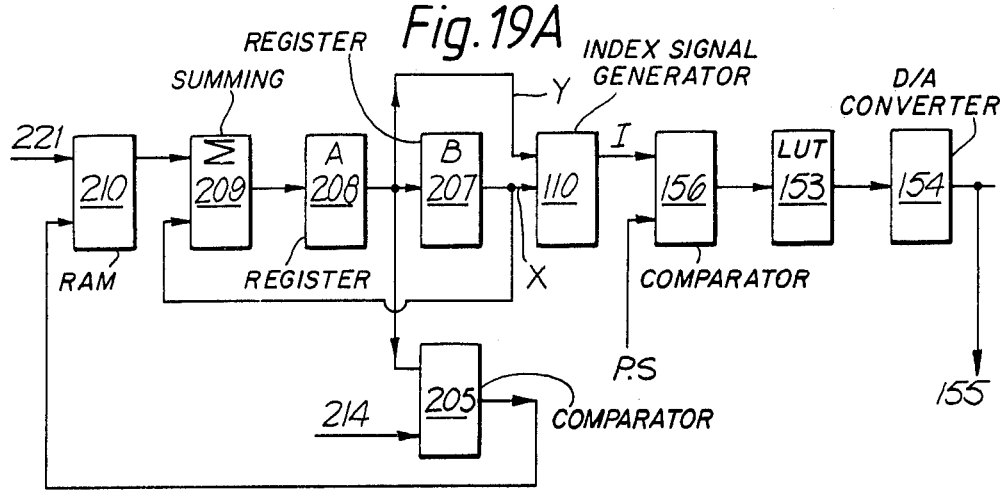
FIG. 19A illustrates a position computer in combination with a dot border computer.

The complete computing system for a single beam is shown in FIG. 19A. In this system, the increments ΔX and ΔY are added to position signals X and Y respectively using the same summing unit 209. The increments ΔX and ΔY, together with special increments ΔXb and ΔYb to be described below, are stored in a random access memory unit 210 controlled by a 2 bit address signal 221 for selecting X or Y. The 16 bit increment signals emerging from the RAM 210 are alternately ΔX and ΔY, the signals being clocked into the summing unit 209 at twice the frequency of the scanning beam reaching successive scanning points x, so that each position signal (X or Y) receives one increment (ΔX or ΔY) for each scanning point. The position signals X and Y are stored as 16 bit numbers in the A register 208 and the B register 207. When an increment ΔX has been added to signal X, the result is stored in register A, while the position signal Y is transferred from register A to register B. The signal Y stored in register B is then combined with the increment ΔY, the result being stored in register A, while the new position of signal X is transferred to register B. The most significant 6 bits of the new position signals are then read out from the registers A and B (208 and 207) into the index signal generation unit 110 which produces a signal I. The further units for processing the index signal I and picture signal PS, units 156, 153 and 154 produce an output signal 155 in a manner to be described below with reference to FIG. 13. The computer of FIG. 19A works in the manner described above during the progression of the scanning beam across a dot area of the screen grid. The increments to the position signals, ΔX and ΔY, remain unaltered. However, when the scanning beam approaches the border of a dot area (or other elemental area including several dots for example) the computer adds special increments ΔXb and ΔYb instead of the normal increments ΔX and ΔY. The computer detects the approach of a dot border by comparing each of the position signals taken from the register A (208) in a comparator unit 205 with a predetermined border value represented by an 8-bit signal 214. The comparator unit 205 provides a signal to the RAM memory unit 210 if the scanning beam has reached the border. The memory 210 then selects the special increments instead of the normal increments for the purposes of the next two additions by the summing unit 209. As the values of the increments applied to the position signals determine the effective screen angle and the screen ruling, i.e. the spacing between successive rows of dots, the overall screen angle and screen ruling can be determined with a much greater precision by making fine adjustment to the increments at each successive dot border. Normally, the condition that the half-tone dot area border is approached by the scanning beam is detected by comparing each position signal value with half the length of a dot area side, equality of these two quantities signifiying that the beam is actually on the half-tone dot area border. The border value signal 214 may have to be adjusted so that the computer will anticipate the arrival of the beam at the border, to compensate for any delay introduced in the operation of the memory 210, the comparator 205 then providing a positive signal to the memory 210 just before the arrival of the beam at the border. The special values of the increments ΔXb and ΔYb are preferably chosen so that the position signals are adjusted at the border to represent the arrival of the scanning beam at the opposite side of the same half-tone dot area (or the same elemental area), causing the scanning beam effectively to scan only one such area.

Figure 19B:
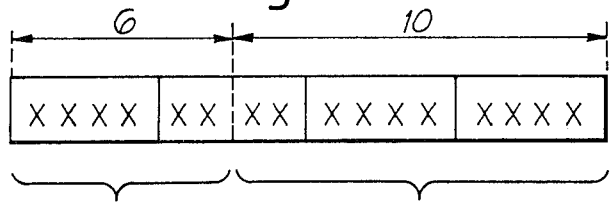
FIG. 19B shows a word of data used to represent a position signal.

FIG. 19B shows the data format for the position signals X and Y, which consist of a 6-bit address for addressing the generation unit 110, together with a 10-bit fractional part.

Figure 20:
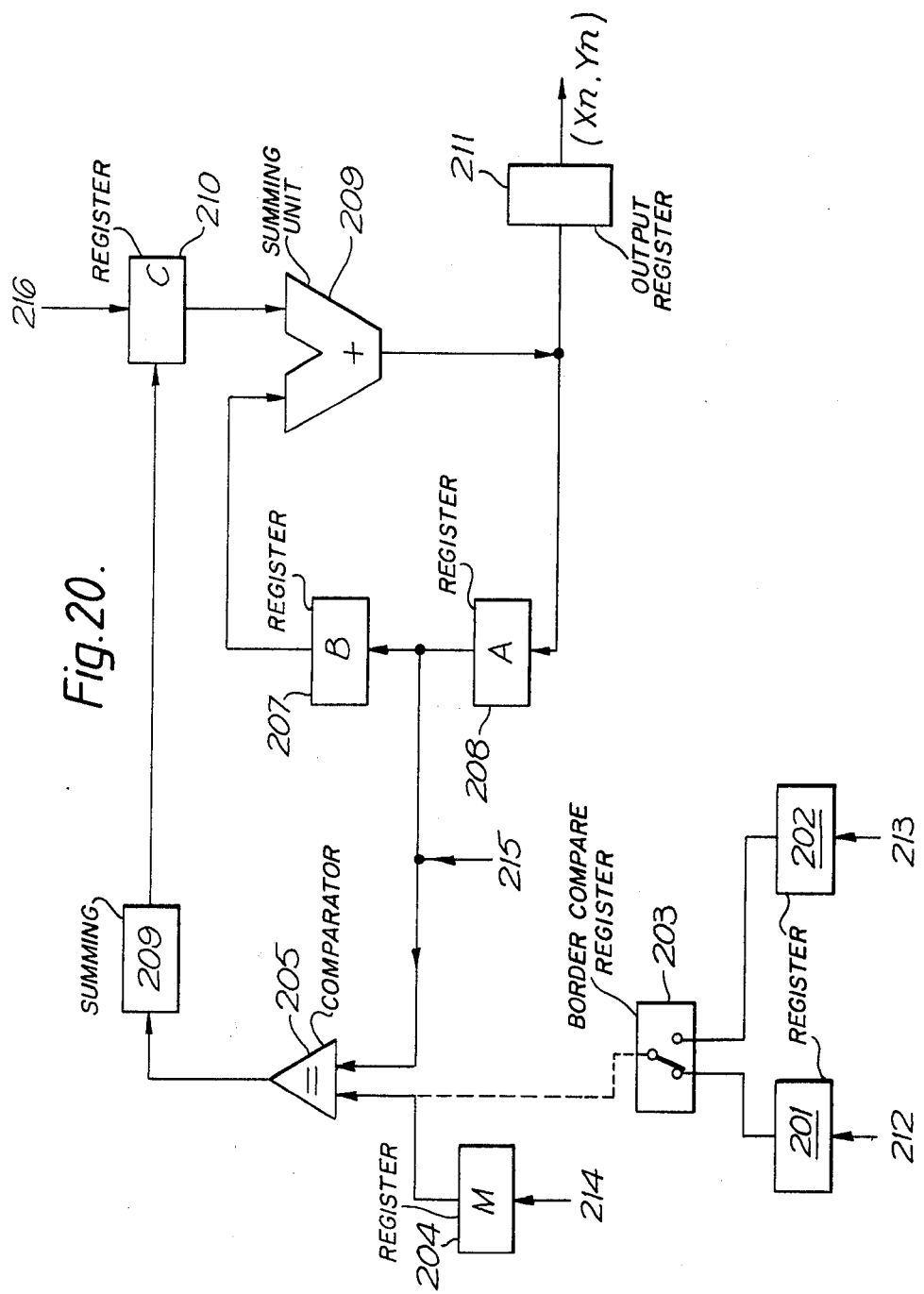
FIG. 20 is a diagram of another form of position computer.

FIG. 20 shows an alterative form of the position computer 40. The summing unit 209 corresponds to the summing unit of FIG. 16A, as do the registers A and B, 208 and 207. Successive output signals Xn and Yn are stored in an output register 211. A register C, 210, corresponds to the RAM memory 210 of FIG. 19A, which is initialized by a microprocessor unit (not shown) which may be a type 6809 and which supplies signals 215 representing values of the increments ΔX, ΔY, ΔXb, ΔYb. The unit C (210) is accessed under the control of logic or a sequencing unit 206, which controls which of the four increments is chosen. The choice of the increment is determined in accordance with the result of a comparison of the current position signal values with a border value in a comparator 205. The border value may be provided by a register M, 204, initialised at the start of each vertical scan by a microprocessor supplying a MPU signal 214. Alternatively, there is an optional border compare register 203 which selects either an X border value in a register 201, or a Y border value in a register 202, each register 201, 202 being initialised at the start of each vertical scan by signals 212, 213 from the MPU. This alternative to the use of the register M, indicated in dotted lines in FIG. 20, allows for the possibility of the dot area border being crossed when Xn and Yn differ in sign (polarity) and/or in amplitude. A switch in the unit 203 compensates for the sign of the position signal and is switched according to the clocking of Xn or Yn.

Figure 21:
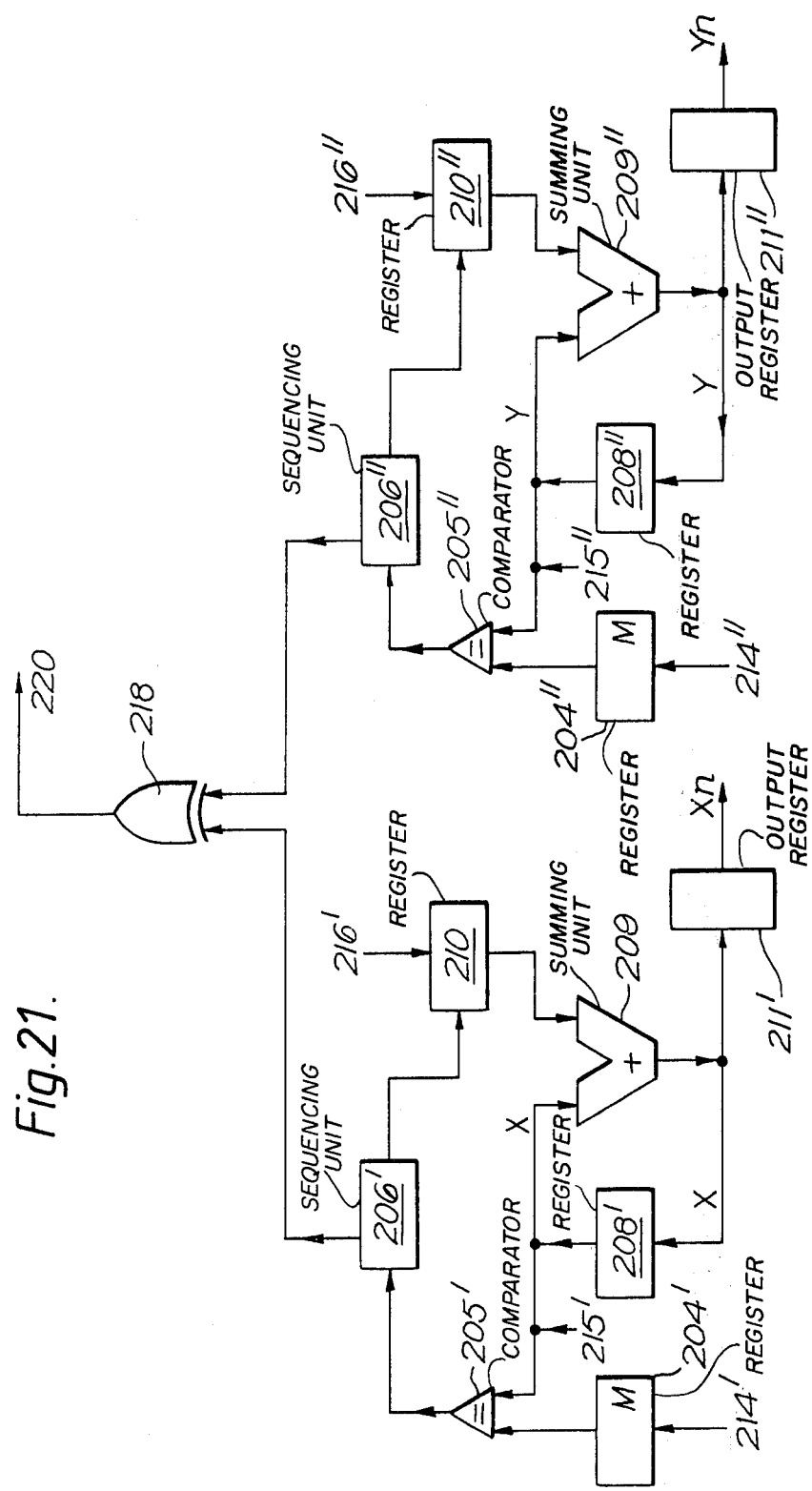
FIG. 21 shows a position computer which is about twice as fast and as big as that of FIG. 10.

FIG. 21 shows a position computer identical to that of FIG. 20, but split into 2 parallel computers, responsible for Xn and Yn respectively. The overall computer is therefore about twice as large and twice as fast. The component parts are labelled with the same numerals, appropriately primed. Signals are also taken from the logic or sequencing unit 206' and 206", and combined in a gate 218. The resulting signal 220 is used as an area counter. This feature is optional, and may be used in subsequent parts of the system to identify which dot area is currently being scanned, where for example there is a repeated pattern of four dot areas with differently-oriented dots in each area. The area counter signal 220 might for example be used to alter the polarity of the position signals X and/or Y or the index signal I to provide a dot of the particular orientation or shape which is correct for the currently-scanned dot area.

FIG. 22 shows a similar position computer, incorporating registers A and B, 221 and 222, a summing unit 209, an output register 211, a comparator 205, a sequencing unit 206 and a border value register 204. The position increments $\Delta X$, $\Delta Y$, $\Delta Xb$ and $\Delta Yb$ are fed into the system by means of the signal 215 from a microprocessor unit, instead of being stored in a RAM memory 210. The units are clocked so that register A, 221, is responsible for handling Xn or Yn, and register B, 222, is responsible for handling $\Delta X$ or $\Delta Y$.

With any of the position computers described above, either a logic unit or a sequencer unit 210 may be used. The former is less flexible, but is preferable to the latter because is introduces no delay. If a sequencer is used, the delay has to be compensated for by making the dot area border anticipate the crossing of the border, for example by the amount of time for one horizontal line scan.

As mentioned above, it has proved to be useful to generate "soft" dots with a selected density profile. The specific embodiments of the screen computers described above which generate "on/off" control signals can only create "hard" dots, with a step profile. Attempts have been made, e.g. in British Pat. No. 1,482,522, to "soften" the edges of these "on/off" hard dots by adjusting the threshold levels of several adjacent scanning beams to vary the dot density, but a separate circuit is required for each threshold level, and only the simplest of profiles are possible. British Pat. No. 1,492,740 describes apparatus for modulating at least the beam overlying the edge of a dot, in a multi-beam system, and suggests that all the beams may be modulated independently (page 3, lines 81 to 91).

This principle is adopted in several embodiments of the present invention, in which a multi-level control signal is generated for each beam, dots being contoured to any desired profile, however complex. To achieve multi-level exposure, a recording head may emit light of variable intensity, or it may contain several adjacent exposing elements each of which may be on or off, the overall exposure being multi-levelled.

Figure 12:
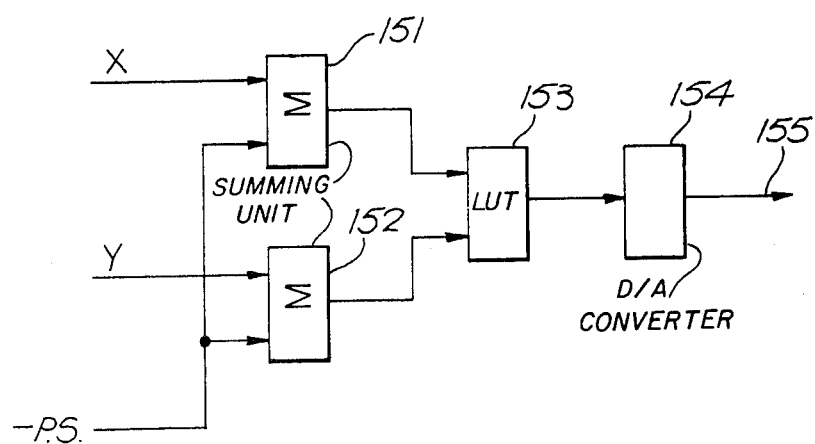
FIGS. 12 to 15 show dot border computer parts of screen computer systems for generating half-tone dot patterns with any dot shape and dot density profile, by generating a multiple level signal to operate a "multi-level" recording beam.

Several embodiments of the invention for generating soft dot patterns will now be described. FIG. 12 shows a dot border computer which is part of a screen computer, as described in this specification. The position signals H1 and H2, or X and Y, are subtracted from the picture signal PS, in units 151, 152, instead of simply being compared. This subtraction yields signals which depend on the distance of the scanning point x from the dot border. (Now that the dot has edges of varying density, there is no longer a step at the dot border between black and white, i.e. off or on, conditions. The dot border, as defined by the picture signal, is taken to mean a contour of intermediate density in a dot. The dot density might vary from a high value in the centre, through intermediate values close to the dot border, to zero near the corners of the dot area square.) The subtracted signals are used to index a dot shape LUT 153 (or are applied to equivalent logic circuitry). This is distinct from the index signal generation unit 110 described above with regard to FIG. 9, because it is effective after the position signals have combined with the picture signal. A digital-to-analogue converter 154 converts the multi-level output from the LUT into an analogue control signal 155 for the multi-level recording head. This system, as shown in FIG. 12, is provided with each "write" scanning beam. The dot shape or dot profile LUT 153 determines the variation of density of the dot with distance from the dot border. It may be accessed using two signals, one representing the distance in the X direction of the scanning point from the dot border as determined by the value of the picture signal, and one representing the corresponding distance in the Y direction.

Figure 13:
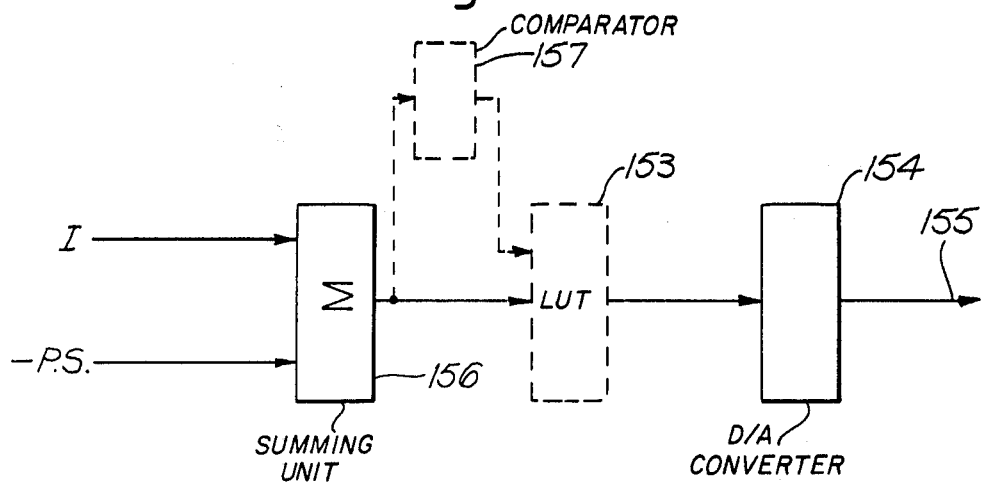

An alternative is shown in FIG. 13, where the screen computer includes an index signal generation unit (not shown), such as is shown in FIG. 9, for generating a position index signal I. This is subtracted from PS in summing unit 156, and the result may, in the simplest case, be used as the control signal 155 after conversion to analogue form. Alternatively, there may be a dot profile LUT 153 (or logic). LUT 153 may, for example, comprise a 256×8 look-up table composed of two bipolar RAM's of the type 93 L422 made by Fairchild Camera and Instrument Corporation. Additionally, a comparator 157 may be included to reduce the size of the LUT 153. If the position is a long way from the dot border, then generally the output has levelled off to a constant density value, either high (dot centre) or low (between dots). The dot profile LUT need only store a substantial amount of data for positions near the dot border, where the density changes. The comparator compares the most significant bits of the adder 156 output with a constant value, to determine the proximity to the dot border and thus to determine whether to index the dot profile LUT for a high/low value or for a variable value near the dot border.

Figure 14:
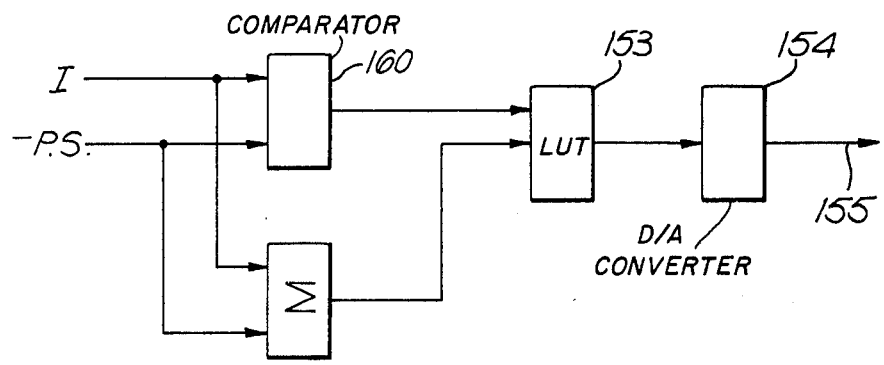
Figure 15:
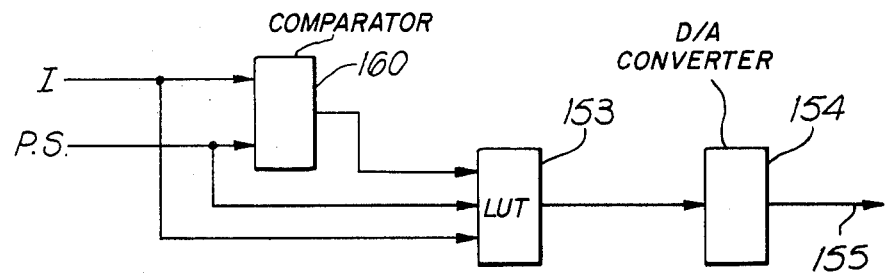

A further alternative to the screen computer of FIG. 13 is outlined in FIG. 14, where the comparator 160 lies parallel to the adder unit. The adder unit may even be dispensed with altogether, its function being taken over by the dot shape LUT 153 as shown in FIG. 15.

Figure 16:
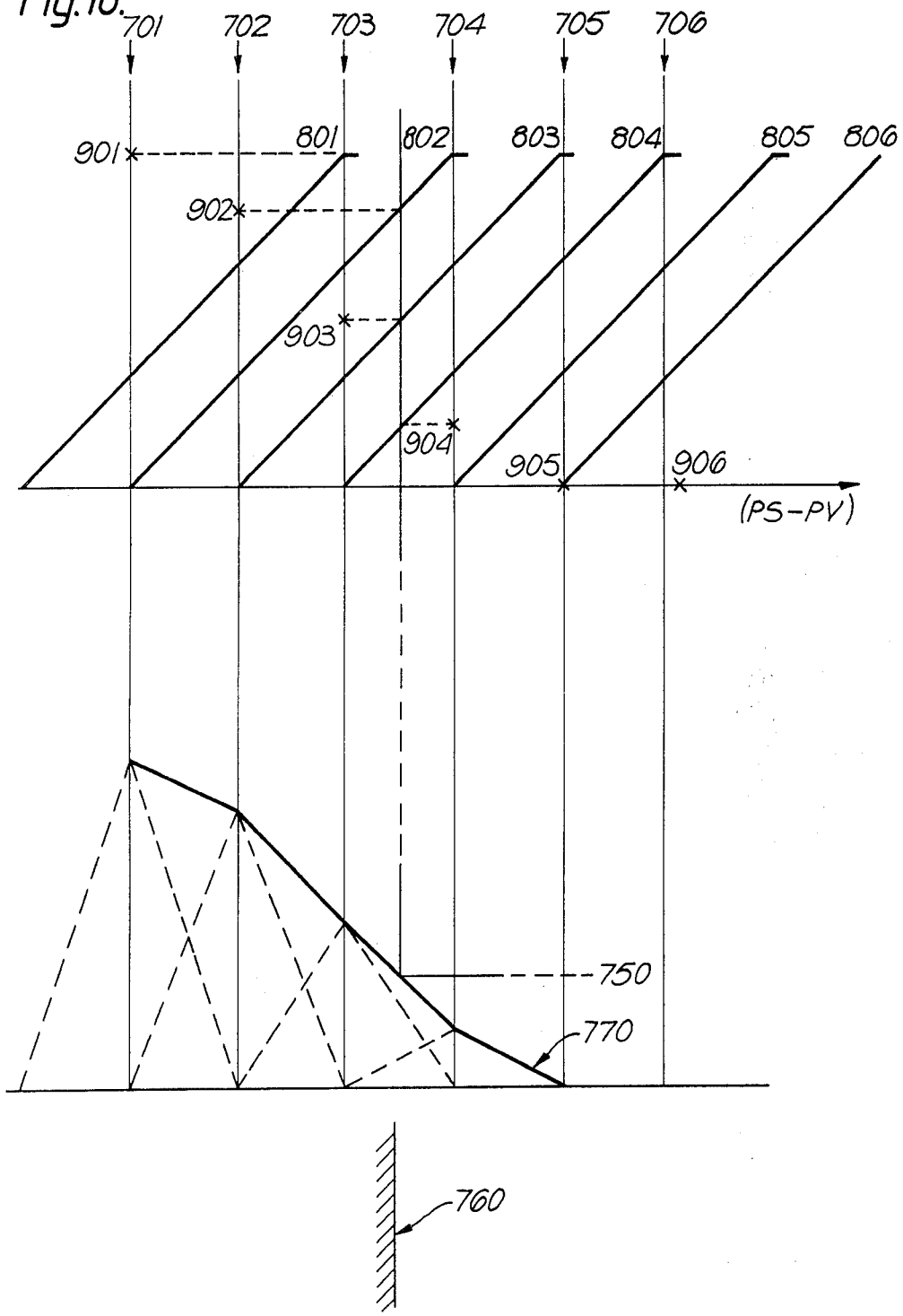
FIG. 16 is a diagram showing how six scanning beams interact to produce a "soft dot" profile.

The intensity profile, provided by six parallel beams, over the edge of a "soft" dot, is illustrated schematically in FIG. 16. The individual intensity profile of each beam is triangular in shape, rising to a sharp peak at the centre; this shape is produced in practice by a laser optical system, as is known in the art. The beams are arranged across the output surface with an equal spacing in the horizontal direction, so that their intensity profiles overlap, as shown in FIG. 17B. In FIG. 17B, all the beams are modulated to the same level of intensity, but in practice they will be different, as shown in FIG. 16, in regions where the required density is varying, such as over a dot border.

Figure 17A:
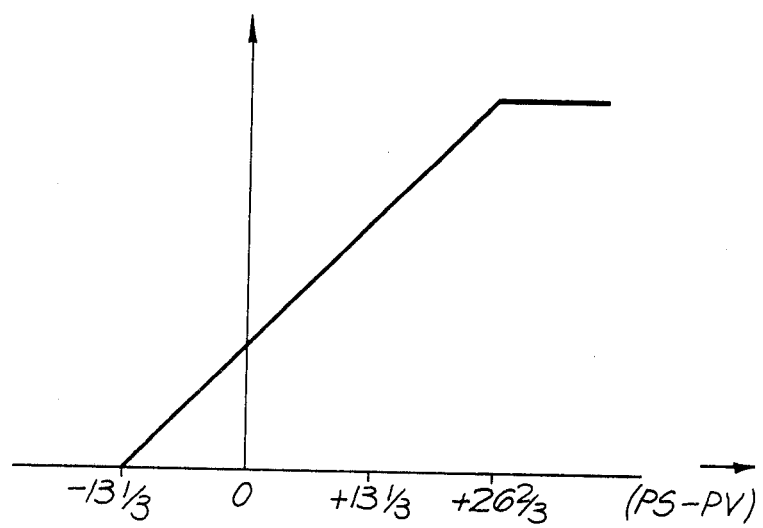
FIG. 17A shows the variation of the scanning beam intensity with distance from the required dot border.
Figure 17B:
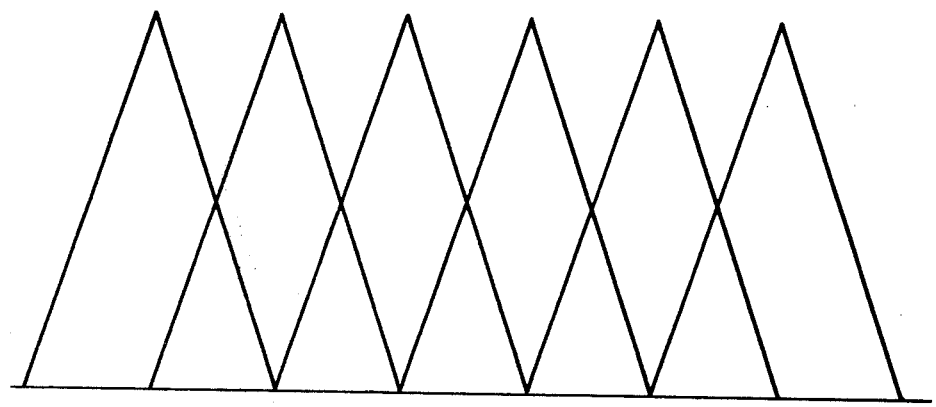
FIG. 17B shows six scanning beams in overlapping relationship.

The index signal I for a given scanning beam may be, for example, the difference between the picture signal PS and a position signal PV, shown as PS−PV in FIG. 17A in which the horizontal axis represents PS−PV in volts. At the point where PS−PV=0, the required intensity of the beam should be exactly at the threshold level of a photographic film used as the output surface. This is the position of the edge of a dot, the contour of PS−PV=0 on the screen grid being called the dot border or dot edge. In regions just outside the dot border, to the right of the vertical axis in FIGS. 16 and 17A, the intensity of the scanning beam is below the film threshold value; in regions inside the dot border, it is above the threshold value. In the darkest region, e.g. at the centre of a dot, the level preferably exceeds 200% of the film threshold value, and may even reach 300%. The variation of the beam intensity, as shown in FIG. 17A, is preferably a linear function of the distance of the beam from the dot border, varying between a zero value and a maximum value.

In FIG. 16, the vertical axis represents beam intensity, and the horizontal axis PS−PV, as in FIG. 17A. The dot border 760 is shown at the bottom of the figure. A first scanning beam 701 is controlled by a first position computer and dot border computer, such as that shown in FIG. 19A. When it is at the relative position on the screen grid shown in the figure, the intensity function 801 requires that for such a large negative value of PS−PV the intensity should be at the maximum value, 901. The resulting contribution made by beam 701 to the overall intensity 770 is shown in dotted lines. A second beam 702 gives an intermediate level of intensity 902, as determined by the intersection of curve 802 with the vertical axis. The remaining four beams, 703 to 706, provide levels of intensity 903 to 906 in accordance with the curves 804 to 806, respectively.

The slope of the intensity curve 770 defining the profile of the dot is arranged to be sufficiently steep at the point 750 that the film threshold level is exceeded, that the dot border is well defined and does not vary substantially with small regional variations in the film threshold value. The slope of the curve 750 should not be so steep that the dot so produced is not etchable, i.e. does not change its size gradually with the application of a chemical etching agent on the resulting film.

Figure 24:
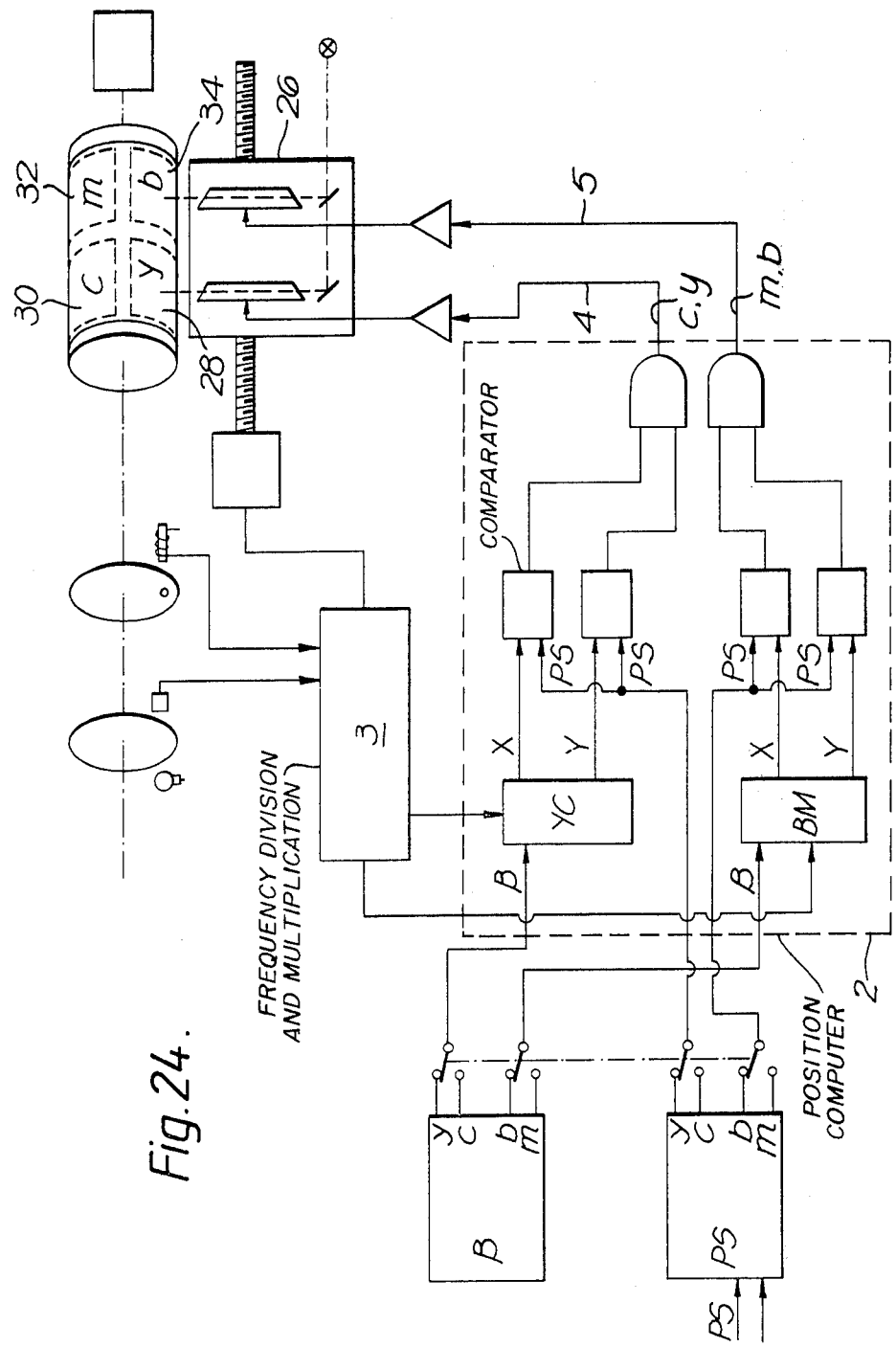
FIG. 24 shows the output section of the system of FIG. 1, embodying the present invention.

FIG. 24 shows parts of the apparatus of FIG. 1, together with two screen computers of the type shown in FIG. 5. The four output surfaces 28, 30, 32 and 34 are for the recording of yellow, cyan, magenta and black colour separations respectively. The yellow and cyan surfaces are wrapped around the same section of drum, so the exposing head adjacent to that section scans both surfaces in one revolution of the drum. The same is true of the magenta and black surfaces, their section of the drum being displaced longitudinally. The exposing heads are contained in an assembly 26 which is movable longitudinally. In this example, one position computer 2 is used to control each of the two recording heads, and FIG. 24 shows the computers generating two on/off control signals 4, 5, labelled "c, y" and "m, b". A frequency division and multiplication unit 3 is used to clock the position computer 2. When the heads are scanning y and b colour separations, as shown in the figure, the corresponding y and b picture signals (PS) must be selected from the reading scanner (not shown in FIG. 24, but labelled 24 in FIG. 1). Each colour separation usually requires a different screen angle $\beta$, so the appropriate data e.g. ($\Delta X$, $\Delta Y$) must simultaneously be selected in a "$\beta$ select" unit. Position signals X, Y for each colour are produced, as described above in conjunction with FIG. 6. This screen computer generates square dot patterns, but computers using any of the methods and apparatus described above may incorporated in the apparatus of FIGS. 1 and 24. Although only one scanning beam is shown in FIG. 24 for each colour, any number of parallel beams may be controlled by the same position computer, or by parallel position computers. Furthermore, the recording heads may be of the multiple level type, and multi-level control signals may be generated by the screen computers.

With all the computers described above, it has been assumed that the picture signal has been approximately corrected before application to the dot border CPU. Typically the outputs from reading head 24 (FIG. 1) will not represent exactly the dot area sizes required. This output must be corrected by means of an LUT or other device in the signal processing unit 1, into the PS values which are required by the screen computer to cause generation of dots of the required area.

Throughout this specification rectangular coordinates have been assumed to describe the position of scanning beam. However, the apparatus could be adapted for use with non-rectangular coordinate systems, should these suit the requirements of the printing system better than with (X, Y) or (H1, H2) coordinates. The dot areas may then be of different shapes, but the same principles would be applicable, for examples when crossing the dot area border. The screen computers as well as the position CPU's would be adapted.

Figure 25:
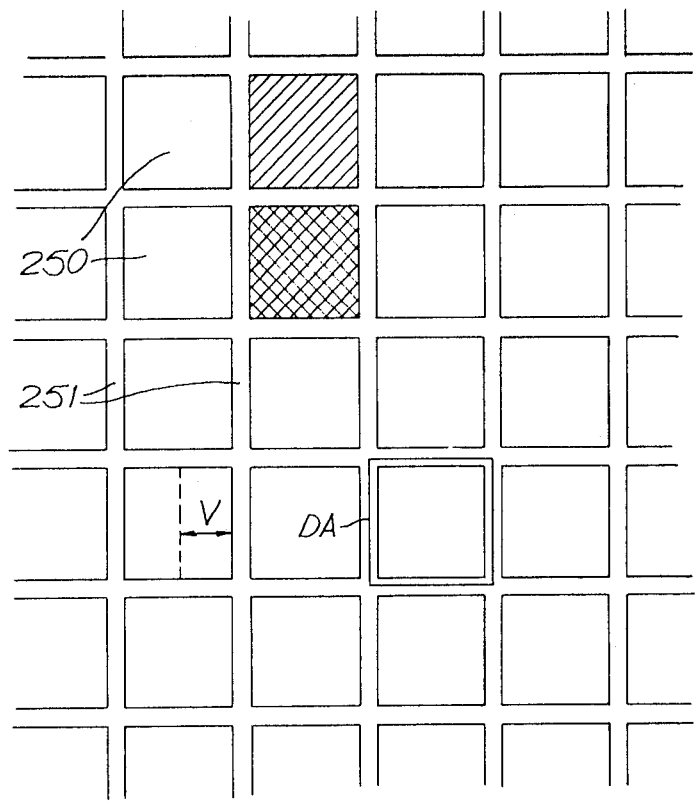
FIG. 25 is a sketch of a screen grid for producing photogravure separations.
Figure 26:
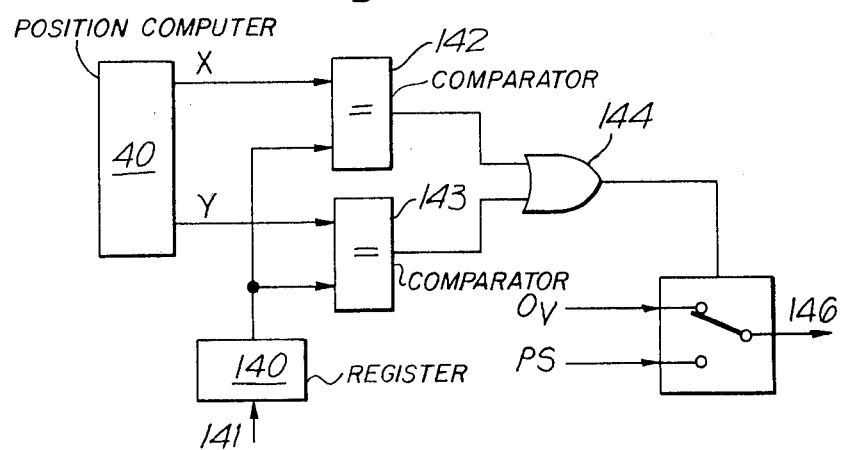
FIGS. 26 to 28 show systems for generating gravure separations.
Figure 27:
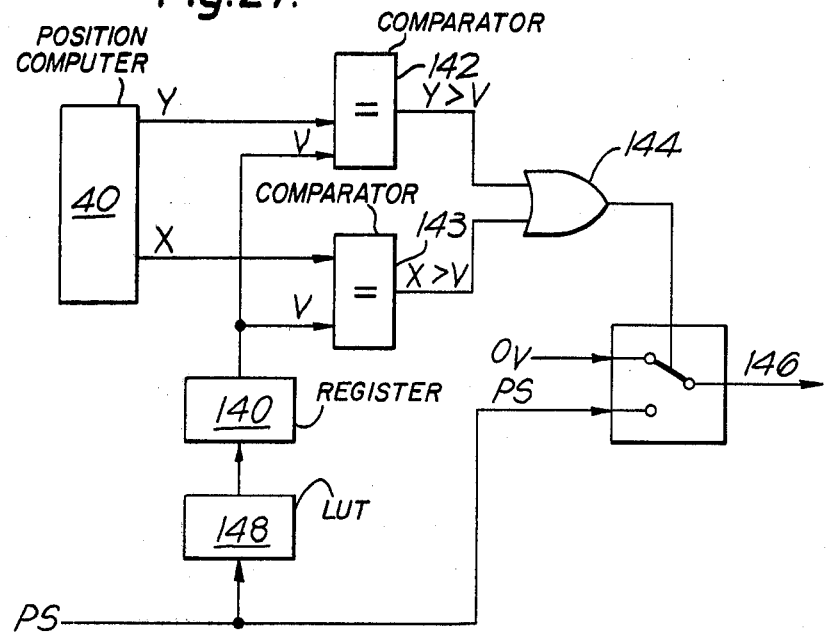
Figure 28:
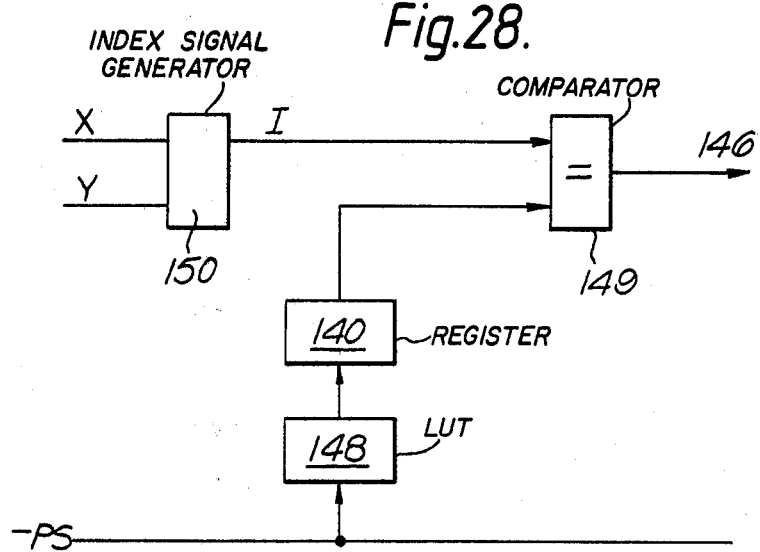

FIGS. 26 to 28 show the possibility of generating gravure separations using a screen computer embodying the invention. The gravure screen usually has a fixed dot pattern, as sketched for example in FIG. 25. The output signal from the screen computer is required to assume a value equal to the picture signal PS within the square dot, and zero in the intervening spaces representing the gravure cell walls on the final printing surface. In FIG. 26, the output 146 is switched between Ov and the picture signal (PS) according to whether the scanning beam lies within dots whose size is defined by a value V (FIG. 25) and is stored in a register 140 initialised by a signal 141. In FIG. 26, V has a fixed value which means the cell walls have a predetermined thickness. This is compared with X and Y in comparators 142, 143 respectively, the results being combined in an OR gate 144 which controls the switching of output 146. Two cells of different tonal densities are shown shaded in FIG. 25, and the constant cell size is represented by the value V.

In FIG. 27, V may be equal to PS, producing variable cell wall thicknesses. The tonal density of the dot, i.e. the depth of the photogravure cell, is also proportional to the picture signal (PS), and this generally varies over the separation and even over a single cell. The invention is thus adaptable to the generation of so-called "hard dot" gravure separations, in which both the square dot size (of the general form of FIG. 25) and the output level (or tonal density) within the dot vary with the picture signal, or with some function of the picture signal derived from optional calibration LUT 148. The picture signal is fed into a register 140 via the optional calibration unit in order to supply the value V as a variable. FIG. 28 shows an improved version in that the cell walls can be calibrated against the picture signal PS.

I claim:

1. A method of making a half-tone reproduction of an original image by exposing an output surface to a scanning beam which assumes conditions in accordance with the value of a control signal, comprising, for the generation of the control signal, the steps of:

(a) generating position signals representing the position of the scanning beam within a half-tone dot area of a screen grid, each successive position in the screen grid of the scanning beam being determined by the repeated addition of small increments to the previous position, and, at each successive position, the position signals being compared with a predetermined value to detect the crossing of the border of the dot area;

(b) comparing each of the position signals with a picture signal representing the picture density at the corresponding point of the original image to be reproduced; and (c) combining the results of the comparisons to generate the control signal which causes the scanning beam to write on the output surface in accordance with the result of the combination of results.

2. A method in accordance with claim 1, wherein step (a) includes the step of comparing, at each successive position within the screen grid, the position signals with a predetermined border value, the result of the comparison, indicating that the half-tone dot area border is approached by the scanning beam, and, when the border is reached, the step of adding special border increments to the position signals.

3. A method in accordance with claim 2, wherein the scanning beam scans through a succession of equally-spaced, parallel, substantially vertical lines over the output surface, and step (a) includes the step of recognizing that a vertical scan has finished, and then initialising the position signals for a new vertical scan.

4. A method in accordance with claim 1, wherein the position signals within a half-tone dot area are compared with a signal representing the width of a half-tone dot area after the addition of the small increments, in order to determine whether the scanning beam has approached the border of the half-tone dot area of the screen grid, and if so, adjusting the signals to represent the arrival of the scanning beam at the opposite side of the same half-tone dot area, causing the scanning beam effectively to scan only one such area.

5. A method in accordance with any preceding claim, for producing a "hard dot" half-tone reproduction, wherein the scanning beam assumes "on" and "off" conditions in accordance with two possible values of the control signal.

6. A method in accordance with any of claims 1 to 4, for making a "soft dot" half-tone reproduction, by exposing the output surface to the scanning beam which assumes a level of intensity in accordance with the value of the control signal, wherein in step (c) the results of the combinations are processed to generate the control signal which causes the scanning beam to record at a level of intensity in accordance with the processing of the results.

7. A method in accordance with any of claims 1 to 4, wherein two position signals for each scanning beam represent distances along mutually orthogonal axes parallel to the boundaries of a dot area, the condition that the half-tone dot area border is approached by the scanning beam being detected by comparing each position with the border value.

8. A method in accordance with any of claims 1 to 4, wherein step (a) includes the step of deriving from the position signals a single index signal for the scanning beam;

and wherein in step (b) the index signal is compared with the picture signal.

9. A method in accordance with claim 8, wherein the result of the combination of the index signal and the picture signal is a signal representing the proximity in the screen grid of the scanning beam to a dot edge, the position of the dot edge being a function of the picture signal and being a contour of equal intensity in the required dot.

10. A method in accordance with claim 9, wherein the signal representing the proximity of the scanning beam to a dot edge is processed in step (c) to generate a control signal which varies as a linear function of said signal between zero and a predetermined constant value, causing zero and maximum exposure respectively of the output surface by the scanning beam.

11. A method in accordance with claim 6, wherein the variation in intensity of the effective exposure of a film constituting the output surface across edges of dots is sufficiently steep that minor variations in a film threshold value of the film do not substantially affect the position of the dot edge produced, yet is sufficiently gentle that the dots are easily etchable.

12. A method in accordance with claim 11, wherein the exposure at the centre of each dot is to at least 200% of the film threshold value.

13. A method in accordance with claim 12, wherein said exposure is up to 300% of the film threshold value.

14. A method of making a half-tone reproduction of an original image by exposing an output surface to a plurality of scanning beams each of which is produced according to a method in accordance with any of claims 1 to 4, wherein each of the scanning beams assumes conditions in accordance with the value of a respective control signal, the method comprising, for the generation of each control signal, the steps of;

(a) generating position signals representing the position of the corresponding scanning beam within a half-tone dot area of a screen grid, each successive position in the screen grid of the scanning beam being determined by the repeated addition of small increments to the previous position, and, at each successive position, the position signals being compared with a predetermined value to detect the crossing of the border of the dot area;

(b) deriving from said position signals an index signal;

(c) comparing the index signal with a picture signal representing the picture density at the point of the original image to be reproduced corresponding to the position represented by said position signals; and (d) according to the result of said comparison, generating the control signal which causes its respective scanning beam to write accordingly on the output surface.

15. A method in accordance with claim 14, for making a "soft dot" half-tone reproduction, by exposing the output surface to the scanning beams which assume levels of intensity in accordance with the values of the corresponding control signals, wherein in step (c) the index signal is combined with the picture signal;

and wherein in step (d) the result of the comparison is processed to generate the control signal which causes the scanning beam to record at a level of intensity in accordance with the processing of the result.

16. A method in accordance with any of claims 1 to 4, of making a half-tone reproduction by exposing the output surface to a plurality of scanning beams, wherein each scanning beam scans through a succession of parallel, substantially vertical lines over the output surface with a first predetermined equal spacing between successive lines, the scan progressing steadily in a horizontal direction, the scanning beams being arranged across the output surface with a second predetermined horizontal spacing between each scanning beam that is much smaller than said first spacing, so that there is substantially no overlap between successively-scanned groups of scanning lines.

17. A method in accordance with claim 16, wherein the plurality of scanning beams overlap, said second predetermined spacing being defined as the horizontal distance between points of maximum intensity in adjacent beams, the effective exposure of the output surface being equal to the sum of the intensities of the overlapping beams and varying smoothly across the screen grid between a minimum in regions outside dots to a maximum in central regions of dots.

18. A method in accordance with any of claims 1 to 4, wherein position signals are generated for each scanning beam and for each of two or more different colour separations which require different screen angles, the position signals corresponding to the different values of the screen angle being computed either simultaneously, or sequentially according to the rotation of each successive colour separation output surface past a recording head.

19. A method in accordance with claim 18, wherein at least two output surfaces, to form two colour separations after exposure, are wrapped around a drum so that each passes the same exposing head in each revolution of the drum, and the extraction from a store of picture signals for each successive colour separation is controlled synchronously with the changing of the screen angle to be used in the position signal computation.

20. Apparatus for producing a half-tone reproduction of an original image by exposing an output surface to a scanning beam which assumes conditions in accordance with the value of a control signal, comprising:
 a support for the output surface;
 an exposing head for producing the scanning beam and exposing the output surface when placed on the support;
 means for obtaining a relative scanning motion between the exposing head and the output surface; and a screen computer for generating the beam control signal by:
 (a) generating position signals representing the position of the scanning beam within a half-tone dot area of a screen grid, each successive position in the screen grid of the scanning beam being determined by the repeated addition of small increments to the previous position, and, at each successive position, the position signals being compared with a predetermined value to detect the crossing of the border of the dot area;
 (b) comparing each of the position signals with a picture signal representing the picture density at the corresponding point of the original image to be reproduced; and
 (c) combining the results of the comparisons to generate the control signal which causes the scanning beam to write on the output surface in accordance with the result of said combination of results.

21. Apparatus in accordance with claim 20, wherein the screen computer compares, at each successive position within the screen grid, the position signals with a predetermined border value, the result of the comparison indicating that the half-tone dot area border is approached by the scanning beam, and, when the border is reached, adds special border increments to the position signals.

22. Apparatus in accordance with claim 20 or 21, wherein the scanning beam scans through a succession of equally-spaced, parallel, substantially vertical lines over the output surface, and step (a) includes the step of recognizing that a vertical scan has finished, and then initialising the position signals for a new vertical scan.

23. A method of producing photogravure separations corresponding to an original image by exposing an output surface to a scanning beam which assumes conditions in accordance with the value of a control signal, comprising, for the generation of the control signal, the steps of:
 (a) generating position signals representing the position of the scanning beam within a gravure cell area of a screen grid, each successive position in the screen grid of the scanning beam being determined by the repeated addition of small increments to the previous position, and, at each successive position, the position signals being compared with a predetermined value to detect the crossing of the border of the gravure cell area;
 (b) comparing each of the position signals with a picture signal representing the picture density at the corresponding point of the original image to be reproduced; and
 (c) combining the results of said comparisons to generate the control signal which assumes either a predetermined constant value, to cause the beam to produce part of a gravure cell wall, or elsa a cell depth value to cause the beam to produce part of a gravure cell.

24. A method in accordance with claim 23, wherein the cell depth value is proportional to the picture signal level.

* * * * *